US009185120B2

(12) United States Patent
Mahadevan et al.

(10) Patent No.: US 9,185,120 B2
(45) Date of Patent: Nov. 10, 2015

(54) METHOD AND SYSTEM FOR MITIGATING INTEREST FLOODING ATTACKS IN CONTENT-CENTRIC NETWORKS

(71) Applicant: Palo Alto Research Center Incorporated, Palo Alto, CA (US)

(72) Inventors: Priya Mahadevan, Sunnyvale, CA (US); Ersin Uzun, Campbell, CA (US); Alexander Afanasyev, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 119 days.

(21) Appl. No.: 13/971,321

(22) Filed: Aug. 20, 2013

(65) Prior Publication Data

US 2014/0351929 A1 Nov. 27, 2014

Related U.S. Application Data

(60) Provisional application No. 61/826,931, filed on May 23, 2013.

(51) Int. Cl.
*G06F 11/00* (2006.01)
*H04L 29/06* (2006.01)
*G06F 7/04* (2006.01)

(52) U.S. Cl.
CPC .................................. *H04L 63/1408* (2013.01)

(58) Field of Classification Search
CPC .... H04L 67/327; H04L 63/1408; H04L 67/10
See application file for complete search history.

(56) References Cited

U.S. PATENT DOCUMENTS

| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,629,370 | A | 5/1997 | Freidzon |
| 5,870,605 | A | 2/1999 | Bracho |
| 6,052,683 | A | 4/2000 | Irwin |
| 6,091,724 | A | 7/2000 | Chandra |
| 6,173,364 | B1 | 1/2001 | Zenchelsky |
| 6,233,646 | B1 | 5/2001 | Hahm |

(Continued)

FOREIGN PATENT DOCUMENTS

| DE | 1720277 A1 | 6/1967 |
| DE | 19620817 A1 | 11/1997 |

(Continued)

OTHER PUBLICATIONS

Fall, K. et al., "DTN: an architectural retrospective" Selected areas in communications, IEEE Journal on, vol. 28, No. 5, Jun. 1, 2008, pp. 828-835.

(Continued)

*Primary Examiner* — Dede Zecher
*Assistant Examiner* — Trang Doan

(57) ABSTRACT

One embodiment of the present invention provides a system for mitigating interest flooding attacks in content-centric networks (CCNs). During operation, the system receives, at a physical interface of a router, an interest packet; obtains current interest satisfaction statistics associated with the physical interface; and determines whether to forward or drop the interest packet based on the current interest satisfaction statistics.

22 Claims, 10 Drawing Sheets

(56) References Cited

U.S. PATENT DOCUMENTS

| | | |
|---|---|---|
| 6,332,158 B1 | 12/2001 | Risley |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,772,333 B1 | 8/2004 | Brendel |
| 6,917,985 B2 | 7/2005 | Madruga |
| 6,981,029 B1 * | 12/2005 | Menditto et al. ............. 709/217 |
| 7,031,308 B2 | 4/2006 | Garcia-Luna-Aceves |
| 7,257,837 B2 | 8/2007 | Xu |
| 7,287,275 B2 | 10/2007 | Moskowitz |
| 7,315,541 B1 | 1/2008 | Housel |
| 7,350,229 B1 | 3/2008 | Lander |
| 7,382,787 B1 | 6/2008 | Barnes |
| 7,444,251 B2 | 10/2008 | Nikovski |
| 7,467,408 B1 * | 12/2008 | O'Toole, Jr. ................... 726/22 |
| 7,496,668 B2 | 2/2009 | Hawkinson |
| 7,509,425 B1 | 3/2009 | Rosenberg |
| 7,525,921 B1 * | 4/2009 | Yi Dar Lo .................... 370/241 |
| 7,543,064 B2 | 6/2009 | Juncker |
| 7,552,233 B2 | 6/2009 | Raju |
| 7,555,563 B2 | 6/2009 | Ott |
| 7,567,547 B2 | 7/2009 | Mosko |
| 7,580,971 B1 | 8/2009 | Gollapudi |
| 7,623,535 B2 | 11/2009 | Guichard |
| 7,647,507 B1 | 1/2010 | Feng |
| 7,685,290 B2 | 3/2010 | Satapati |
| 7,698,463 B2 | 4/2010 | Ogier |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 8,000,267 B2 | 8/2011 | Solis |
| 8,010,691 B2 | 8/2011 | Kollmansberger |
| 8,074,289 B1 | 12/2011 | Carpentier |
| 8,160,069 B2 | 4/2012 | Jacobson |
| 8,204,060 B2 | 6/2012 | Jacobson |
| 8,224,985 B2 | 7/2012 | Takeda |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,665,757 B2 | 3/2014 | Kling |
| 8,667,172 B2 | 3/2014 | Ravindran |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,817,594 B2 | 8/2014 | Gero |
| 8,826,381 B2 | 9/2014 | Kim |
| 2002/0010795 A1 | 1/2002 | Brown |
| 2002/0048269 A1 | 4/2002 | Hong |
| 2002/0078066 A1 | 6/2002 | Robinson |
| 2002/0138551 A1 | 9/2002 | Erickson |
| 2002/0176404 A1 | 11/2002 | Girard |
| 2002/0199014 A1 | 12/2002 | Yang |
| 2003/0046437 A1 | 3/2003 | Eytchison |
| 2003/0051100 A1 | 3/2003 | Patel |
| 2003/0074472 A1 | 4/2003 | Lucco |
| 2004/0024879 A1 | 2/2004 | Dingman |
| 2004/0030602 A1 | 2/2004 | Rosenquist |
| 2004/0139230 A1 | 7/2004 | Kim |
| 2004/0221047 A1 | 11/2004 | Grover |
| 2004/0252683 A1 | 12/2004 | Kennedy |
| 2005/0028156 A1 | 2/2005 | Hammond |
| 2005/0043060 A1 | 2/2005 | Brandenberg |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0051055 A1 | 3/2006 | Ohkawa |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0215684 A1 | 9/2006 | Capone |
| 2006/0223504 A1 | 10/2006 | Ishak |
| 2007/0019619 A1 | 1/2007 | Foster |
| 2007/0073888 A1 | 3/2007 | Madhok |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2008/0005056 A1 | 1/2008 | Stelzig |
| 2008/0010366 A1 | 1/2008 | Duggan |
| 2008/0028467 A1 * | 1/2008 | Kommareddy et al. ........ 726/23 |
| 2008/0046340 A1 | 2/2008 | Brown |
| 2008/0101357 A1 | 5/2008 | Iovanna |
| 2008/0123862 A1 | 5/2008 | Rowley |
| 2008/0133755 A1 | 6/2008 | Pollack |
| 2008/0159271 A1 | 7/2008 | Kutt |
| 2008/0186901 A1 | 8/2008 | Itagaki |
| 2008/0215669 A1 | 9/2008 | Gaddy |
| 2008/0270618 A1 | 10/2008 | Rosenberg |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0077184 A1 | 3/2009 | Brewer |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0144820 A1 * | 6/2009 | Kurapati et al. ................. 726/22 |
| 2009/0157887 A1 | 6/2009 | Froment |
| 2009/0185745 A1 | 7/2009 | Momosaki |
| 2009/0193101 A1 | 7/2009 | Munetsugu |
| 2009/0228593 A1 | 9/2009 | Takeda |
| 2009/0268905 A1 | 10/2009 | Matsushima |
| 2009/0287835 A1 | 11/2009 | Jacobson |
| 2009/0288163 A1 | 11/2009 | Jacobson |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0046546 A1 | 2/2010 | Ram |
| 2010/0057929 A1 | 3/2010 | Merat |
| 2010/0088370 A1 | 4/2010 | Wu |
| 2010/0098093 A1 | 4/2010 | Ejzak |
| 2010/0103870 A1 | 4/2010 | Garcia-Luna-Aceves |
| 2010/0124191 A1 | 5/2010 | Vos |
| 2010/0131660 A1 | 5/2010 | Dec |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0195653 A1 | 8/2010 | Jacobson |
| 2010/0195654 A1 | 8/2010 | Jacobson |
| 2010/0195655 A1 | 8/2010 | Jacobson |
| 2010/0232402 A1 | 9/2010 | Przybysz |
| 2010/0232439 A1 | 9/2010 | Dham |
| 2010/0235516 A1 | 9/2010 | Nakamura |
| 2010/0250939 A1 | 9/2010 | Adams |

(56) References Cited

U.S. PATENT DOCUMENTS

| | | |
|---|---|---|
| 2010/0268782 A1 | 10/2010 | Zombek |
| 2010/0284309 A1 | 11/2010 | Allan |
| 2010/0284404 A1 | 11/2010 | Gopinath |
| 2011/0022812 A1 | 1/2011 | vanderLinden |
| 2011/0055392 A1 | 3/2011 | Shen |
| 2011/0090908 A1 | 4/2011 | Jacobson |
| 2011/0106755 A1 | 5/2011 | Hao |
| 2011/0119761 A1* | 5/2011 | Wang et al. ............... 726/23 |
| 2011/0138463 A1* | 6/2011 | Kim et al. ............... 726/22 |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0271007 A1 | 11/2011 | Wang |
| 2011/0280214 A1* | 11/2011 | Lee et al. ............... 370/331 |
| 2011/0286457 A1 | 11/2011 | Ee |
| 2011/0286459 A1 | 11/2011 | Rembarz |
| 2011/0299454 A1 | 12/2011 | Krishnaswamy |
| 2012/0011551 A1 | 1/2012 | Levy |
| 2012/0036180 A1 | 2/2012 | Thornton |
| 2012/0066727 A1 | 3/2012 | Nozoe |
| 2012/0114313 A1 | 5/2012 | Phillips |
| 2012/0120803 A1 | 5/2012 | Farkas |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0179653 A1 | 7/2012 | Araki |
| 2012/0221150 A1 | 8/2012 | Arensmeier |
| 2012/0290669 A1 | 11/2012 | Parks |
| 2012/0290696 A1* | 11/2012 | Wu et al. ............... 709/223 |
| 2012/0290919 A1 | 11/2012 | Melnyk |
| 2012/0317307 A1* | 12/2012 | Ravindran et al. ............ 709/238 |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1* | 6/2013 | Byun et al. ............... 709/207 |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0219081 A1* | 8/2013 | Qian et al. ............... 709/241 |
| 2013/0242996 A1 | 9/2013 | Varvello |
| 2013/0282854 A1 | 10/2013 | Jang |
| 2013/0282860 A1 | 10/2013 | Zhang |
| 2013/0282920 A1* | 10/2013 | Zhang et al. ............... 709/238 |
| 2013/0304937 A1 | 11/2013 | Lee |
| 2013/0329696 A1 | 12/2013 | Xu |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0082135 A1 | 3/2014 | Jung |
| 2014/0089454 A1 | 3/2014 | Jeon |
| 2014/0129736 A1* | 5/2014 | Yu ............... 709/242 |
| 2014/0172981 A1 | 6/2014 | Kim |
| 2014/0173034 A1 | 6/2014 | Liu |
| 2014/0195328 A1 | 7/2014 | Ferens |
| 2014/0233575 A1 | 8/2014 | Xie |
| 2014/0237085 A1 | 8/2014 | Park |
| 2014/0280823 A1* | 9/2014 | Varvello et al. ............... 709/223 |
| 2014/0282816 A1 | 9/2014 | Xie |
| 2014/0289790 A1 | 9/2014 | Wilson |

FOREIGN PATENT DOCUMENTS

| | | |
|---|---|---|
| EP | 0295727 A2 | 12/1988 |
| EP | 0757065 A2 | 7/1996 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2011049890 A1 | 4/2011 |

OTHER PUBLICATIONS

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn. The Pairing-Based Cryptography Library, http://crypto.stanford.edu/pbc/.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

(56) References Cited

OTHER PUBLICATIONS

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Content Centric Networking Project (CCN) [online], http://ccnx.org/releases/latest/doc/technical/, Downloaded Mar. 9, 2015.

Content Mediator Architecture for Content-aware Networks (COMET) Project [online], http://www.comet-project.org/, Downloaded Mar. 9, 2015.

D. Boneh, C. Gentry, and B. Waters, 'Collusion resistant broadcast encryption with short ciphertexts and private keys,' in Proc. Crypto 2005, Santa Barbara, CA, USA, Aug. 2005, pp. 1-19.

D. Boneh and M. Franklin. Identity-Based Encryption from the Weil Pairing. Advances in Cryptology—Crypto 2001, vol. 2139, Springer Berlin Heidelberg (2001).

D.K. Smetters, P. Golle, and J.D. Thornton, "CCNx access control specifications," PARC, Tech. Rep., Jul. 2010.

Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.

Dijkstra, Edsger W., and Carel S. Scholten. 'Termination detection for diffusing computations.' Information Processing Letters 11.1 (1980): 1-4.

Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.

E. Rescorla and N. Modadugu, "Datagram transport layer security," IETF RFC 4347, Apr. 2006.

E.W. Dijkstra, W. Feijen, and A.J.M. Van Gasteren, "Derivation of a Termination Detection Algorithm for Distributed Computations," Information Processing Letter, vol. 16, No. 5, 1983.

Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.

G. Ateniese, K. Fu, M. Green, and S. Hohenberger. Improved Proxy Reencryption Schemes with Applications to Secure Distributed Storage. In the 12th Annual Network and Distributed System Security Symposium (2005).

G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.

G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.

G. Xylomenos et al., "A Survey of Information-centric Networking Research," IEEE Communication Surveys and Tutorials, Jul. 2013.

Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.

Garcia-Luna-Aceves, Jose J. 'A unified approach to loop-free routing using distance vectors or link states.' ACM SIGCOMM Computer Communication Review. vol. 19. No. 4. ACM, 1989.

Garcia-Luna-Aceves, Jose J. 'Name-Based Content Routing in Information Centric Networks Using Distance Information' Proc ACM ICN 2014, Sep. 2014.

Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

Heckerman, David, John S. Breese, and Koos Rommelse. "Decision—Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012).

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

Hogue et al., 'NLSR: Named-data Link State Routing Protocol', Aug. 12, 2013, ICN 2013, pp. 15-20.

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Hur, "Improving security and efficiency in attribute-based data sharing," IEEE Trans. Knowledge Data Eng., vol. 25, No. 10, pp. 2271-2282, Oct. 2013.

J. Shao and Z. Cao. CCA-Secure Proxy Re-Encryption without Pairings. Public Key Cryptography. Springer Lecture Notes in Computer Sciencevol. 5443 (2009).

V. Jacobson et al., 'Networking Named Content,' Proc. IEEE CoNEXT '09, Dec. 2009.

Jacobson, Van et al., "Content-Centric Networking, Whitepaper Describing Future Assurable Global Networks", Palo Alto Research Center, Inc., Jan. 30, 2007, pp. 1-9.

Jacobson, Van et al. 'VoCCN: Voice Over Content-Centric Networks.' Dec. 1, 2009. ACM ReArch'09.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

(56) References Cited

OTHER PUBLICATIONS

Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

(56) References Cited

OTHER PUBLICATIONS

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digital Rights Management using Broadcast Encryption. Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

\* cited by examiner

**Pseudocode (*Interest* satisfaction statistics)**

1: for each interface if do
2:      $F_{if} \leftarrow 0$      ▷ forwarded Interests from interface if
3:      $\hat{F}_{if} \leftarrow 0$      ▷ averaged value of $F_{if}$
4:      $U_{if} \leftarrow 0$      ▷ unsatisfied Interests from interface if
5:      $\hat{U}_{if} \leftarrow 0$      ▷ averaged value of $U_{if}$
6: end for
7: function OutInterest (Interest i, InInterface in}
8:      $F_{in} \leftarrow F_{in} + 1$
9:      record in in the list of incoming interfaces for i
10: end function
11: function InterestTimeout (Interest i)
12:      lookup the list of incoming interfaces for i
13:      for each interface if in the list do
14:          $U_{if} \leftarrow U_{if} + 1$
15:      end for
16: end function
17:      ▷ Exponentially weighted moving average smoothing
18: function EWMA      ▷ Every second
19:      $\alpha \leftarrow e^{-1.0/30.0}$
20:      for each interface if do
21:          $\hat{U}_{if} \leftarrow \alpha \cdot \hat{U}_{if} + (1-\alpha) \cdot U_{if}$
22:          $U_{if} \leftarrow 0$
23:          if $F_{if} > 0$ then      ▷ To ensure decaying of ratio $U_{if}/F_{if}$
24:              $\hat{F}_{if} \leftarrow \alpha \cdot \hat{F}_{if} + (1-\alpha) \cdot I_{if}$
25:              $F_{if} \leftarrow 0$      ▷ Reset counters
26:          end if
27:      end for
28: end function

FIG. 2

Pseusocode (Satisfaction-based Interest acceptance)

1: for each interface if do
2:     $L_{if} \leftarrow$ BDP-based Interest Limit
3:     $O_{if} \leftarrow 0$           ▷ Outstanding Interests on interface if
4. end for
5: function OUTINTEREST (Interest i, InInterface in, OutInterface out)
6:                     ▷ Use uniform probability distribution model $P(X)$
7:                     ▷ $P(X): \forall x \in [0,1] \Rightarrow P(x) = x$
8:     if $F_{in} > \theta$ then     ▷ At least some Interests were forwarded before
9:         $s \leftarrow U_{in}/F_{in}$
10:        Drop Interest with probability $P(s)$
11:    end if
12:    forward the Interest
13: end function

14: function InData (Data d)
15:    lookup PIT entry p for Data d
16:    for each outgoing interface out in p do
17:        $O_{out} \leftarrow O_{out} - 1$       ▷ "return" token
18:    end for
19: end function

20: function TIMEOUT (PIT entry $p$)
21:    for each outgoing interface out in p do
22:        $O_{out} \leftarrow O_{out} - 1$       ▷ "return" token
23:    end for
24: end function

FIG. 5

Pseusocode (Satisfaction-based pushback)

1: for each interface if do
2:      $L_{if} \leftarrow$ BDP-based Interest Limit
3:      $O_{if} \leftarrow 0$            ▷ Outstanding Interests on interface if
4. end for

5: $\forall f \in$ interfaces: $L'_f \leftarrow L_f$    ▷ Per-incoming interface Interest limit
6:                    ▷ Announcement from the neighbor
7: function InLIMITS (InInterface in, Limit $L'$)
8:      $L_{in} \leftarrow L'$
9: end function

10: function ANNOUNCELIMITS        ▷ E.g., every second
11:     for each outgoing interface *out* do
12:         for each incoming interface *in* do
13:             $L'_{in} = L_{out} \times (1 - U_{in}/F_{in})$
14:             ANNOUNCELIMITS (*in*, $L'_{in}$)
15:         end for
16:     end for
17: end function

18: function InData (Data d)
19:     lookup PIT entry p for Data d
20:     for each outgoing interface out in p do
21:         $O_{out} \leftarrow O_{out} - 1$        ▷ "return" token
22:     end for
23: end function

24: function TIMEOUT (PIT entry p)
25:     for each outgoing interface out in p do
26:         $O_{out} \leftarrow O_{out} - 1$        ▷ "return" token
27:     end for
28: end function

FIG. 7

METHOD AND SYSTEM FOR MITIGATING INTEREST FLOODING ATTACKS IN CONTENT-CENTRIC NETWORKS

RELATED APPLICATION

This application claims the benefit of U.S. Provisional Application No. 61/826,931, entitled "METHOD AND SYSTEM FOR MITIGATING INTEREST FLOODING ATTACKS IN CONTENT-CENTRIC NETWORKS," by inventors Priya Mahadevan et al., filed May 23, 2013.

This invention was made with U.S. government support under CNS-1040822 (3707) awarded by National Science Foundation. The U.S. government has certain rights in the invention.

BACKGROUND

1. Field

This disclosure is generally related to content-centric networks (CCNs). More specifically, this disclosure is related to a method and a system that can be used to mitigate Distributed Denial of Service (DDoS) attacks in content-centric networks.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., IP address) closely associated with a physical object or location. This restrictive addressing scheme is becoming progressively more inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today' subiquitous, relentlessly growing Internet. People now expect a lot more from the Internet than the ARPAnet was designed to provide. Ideally, an Internet user should have access to any content, anywhere, at any time—a task that is difficult to perform with the current location/device-binding TCP/IP (transmission control protocol/Internet protocol) networks.

Content-centric networks (CCNs), also referred to as "content-based networks," bring a new approach to data transport in a network. Instead of naming and addressing end-hosts in the network as in traditional networks today, CCN emphasizes naming and addressing content directly. Examples of content include a picture, an audio file, a movie, a document, status update in a social network such as Facebook® (registered trademark of Facebook, Inc. of Menlo Park, Calif.) etc. In CCN, content is requested by name directly by the consumer. The network is responsible for routing the consumer's request to the appropriate content producer or provider and for transferring the content or data object from the content producer or provider to the consumer. In contrast to today's Internet, a key goal of the CCN is "security by design." In fact, it guarantees the integrity and provenance of every Data packet with digital signatures and protects user privacy with no source addresses carried in packets. However, current efforts in CCN architecture designs have not considered Distributed Denial of Service (DDoS) attacks, which pose a significant threat to the existing Internet infrastructure. The CCN architecture is also not immune from DDoS attacks and strategies to mitigate such attacks are not well studied yet.

SUMMARY

One embodiment of the present invention provides a system for mitigating interest flooding attacks in content-centric networks (CCNs). During operation, the system receives, at a physical interface of a router, an interest packet; obtains current interest satisfaction statistics associated with the physical interface; and determines whether to forward or drop the interest packet based on the current interest satisfaction statistics.

In a variation on this embodiment, the interest satisfaction statistics associated with the physical interface further include at least one of: per-interface based interest satisfaction statistics, per-name-prefix-per-interface based interest satisfaction statistics, per-face based interest satisfaction statistics, per-name-prefix-per-face based interest satisfaction statistics, per-virtual-interface based interest satisfaction statistics, and per-name-prefix-per-virtual-interface based interest satisfaction statistics.

In a variation on this embodiment, the interest satisfaction statistics indicates a ratio between satisfied interest packets and received interest packets.

In a further variation, determining whether to forward or drop the interest packet is based on the interest satisfaction statistics.

In a further variation, determining whether to forward or drop the interest packet involves: receiving, from a neighboring router, an outstanding interest limit announcement indicating a maximum number of interest packets acceptable by the neighboring router; and assigning an outstanding interest limit for the physical interface based on the interest satisfaction statistics and the maximum number of the outstanding interest packets acceptable by the neighboring router, wherein an outstanding interest is an interest that is not satisfied and not yet expired.

In a variation on this embodiment, obtaining the current interest satisfaction statistics associated with the physical interface involves: determining whether an interest packet has been satisfied by a corresponding data packet, and determining whether an interest packet is removed from a pending interest table due to a timeout.

In a variation on this embodiment, the system updates interest satisfaction statistics subsequent to the interest packet being satisfied or expired.

BRIEF DESCRIPTION OF THE FIGURES

FIG. 2 presents a diagram illustrating a set of pseudocode that can be used to calculate Interest satisfaction statistics, in accordance with an embodiment of the present invention.

FIG. 5 presents a diagram illustrating a set of pseudocode that can be used for satisfaction-based Interest acceptance, in accordance with an embodiment of the present invention.

FIG. 7 presents a diagram illustrating a set of pseudocode that can be used for satisfaction-based pushback, in accordance with an embodiment of the present invention.

In the figures, like reference numerals refer to the same figure elements.

DETAILED DESCRIPTION

Figure 1:
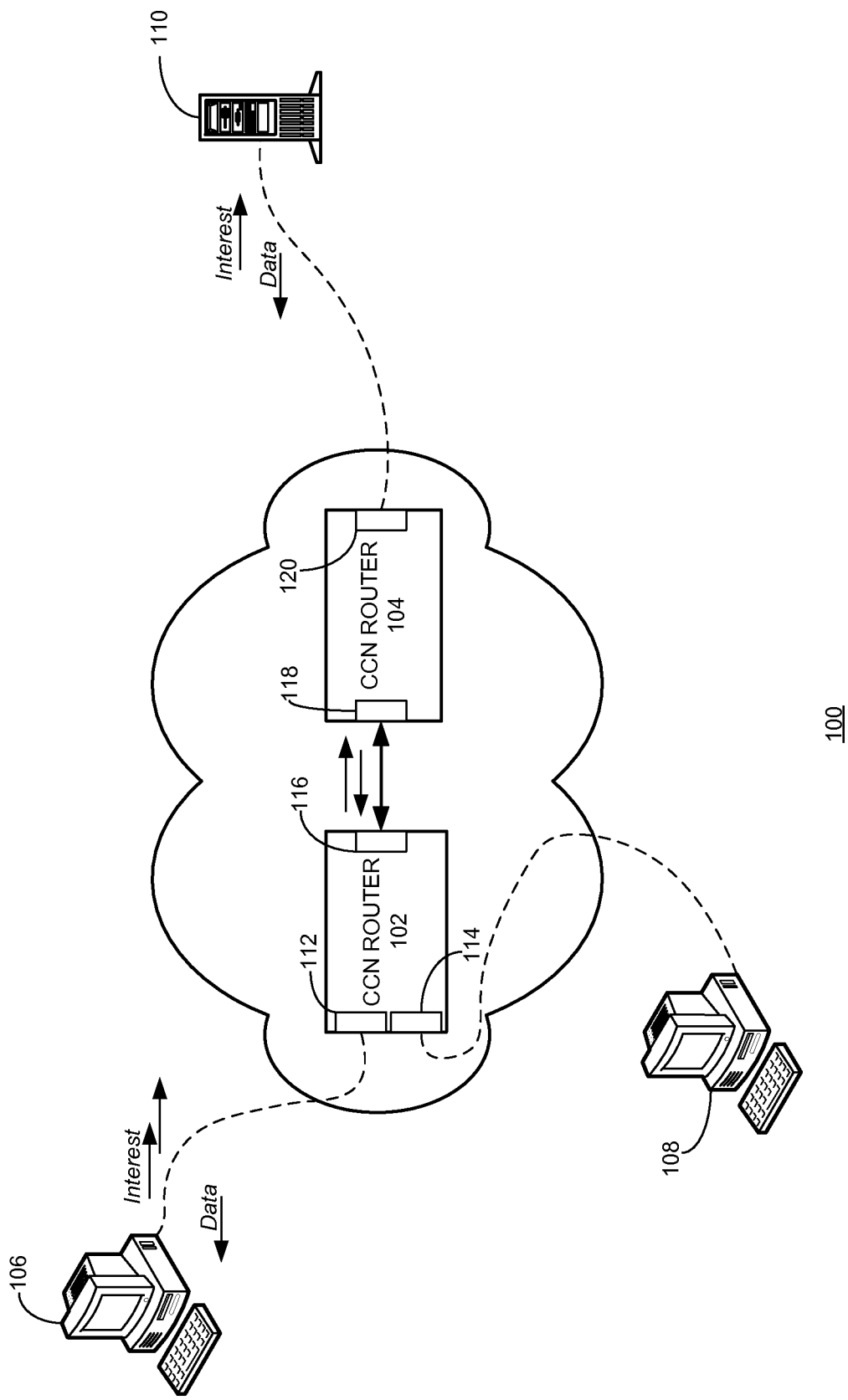
FIG. 1 presents a diagram illustrating an exemplary CCN network experiencing an Interest flooding attack.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a method and a system that mitigates DDoS attacks in content-centric networks. To do so, the system leverages two key features in CCN architecture. More specifically, the system designs a solution based on the per-packet state maintained at intermediate CCN routers and the guaranteed symmetric flow of Interest and Data packets. In some embodiments, the system calculates an interest satisfaction ratio (ISR) for each interface and/or each name prefix forwarded at each interface, and throttles incoming interest packets based on the ISR. In some embodiments, the system distributes forwarding tokens among all interfaces based on the ISR at each interface.

In this disclosure, the term "face" refers to a connection point over which CCN nodes receive and send packets. A face can be a connection point to an application, another CCN node, or some other kind of communication channel. A face may have attributes that indicate expected latency and bandwidth, broadcast or multicast capability, or other useful features.

Interest Flooding in Content-Centric Network

CCN names can include an explicitly specified number of components. In addition, CCN names are persistent and content-specific. That is, if a user changes the content of a file or data object, the modified content is effectively associated with a new name. This persistency can be achieved with an explicit versioning mechanism, where, for example, the new content can be "version 4" of a given name. The version is often a timestamp. The persistency can also be achieved implicitly. For example, contents can be associated with not only their human-established names, but also with authentication metadata (e.g., a digital signature by the publisher of the content). As a result, the complete content name changes when the data associated with a given name changes.

In a content-centric network (CCN), communication is driven by the consumers of data. In a CCN, there are two packet types, Interest and Data. An Interest packet (also called a query) is a request for some content. An Interest packet encodes a special form of query that expresses what content is desired and what content is not desired. The undesired content can be indicated using the special Exclude feature in the Interest packet. A Data packet (also called a content packet) is a unit of content. Data packets are self-identifying by carrying within them their full name. A consumer can ask for content by broadcasting its interest for the content over all available connectivity. Any node hearing the Interest and having data that satisfies it can respond with a Data packet. Data is transmitted only in response to an Interest and consumes that Interest. Both Interest and Data identify the content being exchanged by the content name (or CCN name). In one embodiment, Data can "satisfy" an Interest if the CCN name in the Interest packet is a prefix of the CCN name in the Data packet. For example, an Interest packet with CCN name "/parc/home/abcd" will match content "/parc/home/abcd/test.txt" and "/parc/home/abcd/bar.txt." An Interest may specify the exact version to retrieve or may specify any version greater than a specified version, known as a "get-the-latest-version interest."

Functionally, a CCN can retain associations between various names and the content represented by those names. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the Interest to the prospective publishers, and then carrying any available content back via the Data packet along the reverse of the path which the Interest traversed. Note that the CCN routers route the Interest based on the longest name prefix match, which is similar to IP routing, where routers perform longest prefix match of IP addresses. However, unlike IP routing, an Interest packet and its matching Data packet always take symmetric paths—Data packets always take the reverse path traversed by Interest packets in a CCN network.

Each CCN router maintains three major data structures, including a Pending Interest Table (PIT), a Forwarding Interest Base (FIB), and a Content Store (CS). The PIT holds all "not yet satisfied" Interests that have been sent upstream toward data sources. A PIT entry for an Interest specifies the name of the Interest and one or multiple incoming and outgoing physical interfaces (or CCN faces) for that Interest. Multiple interfaces indicate that the same content has been requested by multiple downstream users, and multiple outgoing interfaces indicate that the same Interest is forwarded along multiple paths.

An FIB maps name prefixes to one or multiple physical network interfaces or faces, defining allowed multipath directions to where Interests can be forwarded. A CS temporarily buffers Data packets that pass through this node, allowing efficient data retrieval by different consumers.

When a router receives an Interest packet, it first checks whether there is a matching data in its CS. If a match is found, the Data packet is sent back to the incoming interface of the Interest packet. If not, the Interest name is checked against the entries in the PIT. If the name already exists in the PIT, then it can be a duplicate Interest (identified by a random number each Interest carries called Nonce) that should be dropped, or an Interest from another consumer asking for the same Data, which requires the incoming interface of this Interest to be added to the existing PIT entry. If the name does not exist in the PIT, the Interest is added into the PIT and forwarded to the interface chosen by the strategy module, which uses the FIB as input for its routing decisions.

When a Data packet is received, its name is used to look up the PIT. If a matching PIT entry is found, the router sends the Data packet to the interface(s) from which the matching Interest was received, caches the Data in the CS, and then removes the matching PIT entry. Otherwise, the Data packet is unsolicited and discarded. In addition to being removed after the Interest is satisfied, a PIT entry may also be removed when a lifetime associated with the Interest expires. Although the maximum lifetime is specified by users, it is ultimately a router's decision how long it is willing to keep a PIT entry.

Because Interest packets consume memory resources at intermediate routers, they may become potential tools for adversaries to launch DDoS attacks in a CCN network. For example, an attacker or a set of distributed attackers can inject excessive amounts of Interests in an attempt to overload the network and cause service disruptions for legitimate users.

FIG. 1 presents a diagram illustrating an exemplary CCN network experiencing an Interest flooding attack. In FIG. 1, a CCN network 100 includes a number of CCN routers (such as routers 102 and 104) and a number of end nodes (such as a legitimate-user end node 106, an adversary end node 108, and a data-producer end node 110). Each router includes a number of physical interfaces. For example, CCN router 102 includes physical interfaces 112, 114, and 116; and CCN router 104 includes physical interfaces 118 and 120.

During operation of CCN network 100, legitimate-user end node 106 may request certain content from data producers, such as data-producer end node 110, by sending an Interest packet to a coupled CCN router. In the example shown in FIG. 1, legitimate-user end node 106 sends Interests to CCN router 102 via physical interface 112. CCN router 102 receives these Interests, checks its PIT or FIB based on the names of these Interests, and forwards these Interests to CCN router 104 via physical interface 116. Similarly, CCN router 104 receives these Interests, checks its PIT or FIB based on the names of these Interests, and forwards these Interests to data-producer end node 110. In the example shown in FIG. 1, CCN router 104 receives these Interests via physical interface 118 and forwards these Interests via physical interface 120.

In response to receiving an Interest packet, data-producer end node 110 responds with a Data packet, which flows back to legitimate-user end node 106 following the path of the Interest packet.

In the meantime, adversary end node 108 attempts to launch a denial of service attack on CCN network 100. Since a CCN network fetches data by its name, an adversary cannot target specific routers or end-hosts. However, an adversary can target a specific namespace. For example, in FIG. 1, if data-producer end node 110 is the exclusive owner of a namespace "/foo/bar", both CCN router 104 and data-producer end node 110 would receive all Interests for "foo/bar/. . ." that cannot be otherwise satisfied from in-network caches. A large volume of such malicious Interests can disrupt service quality in CCN network 100 in two ways: it creates network congestion and exhausts resources on the intermediate routers.

Similar to packets in traditional networks, Interest packets in a CCN network consume a portion of network capacity. A large number of Interest packets might cause congestion and lead to legitimate packets being dropped. In particular, a coordinated DDoS attack could target one specific namespace to concentrate attack traffic in certain segments of the network, typically closest to the publisher serving that namespace.

Because CCN routers maintain per-packet states for each forwarded Interest (i.e., as an entry in its PIT), an excessive number of malicious Interests can lead to exhaustion of a router's memory, making the router unable to create new PIT entries for incoming Interests, thus disrupting service for legitimate users.

Note that an effective Interest flooding attack may not be trivial to create. To target a specific namespace (e.g., /NewYorkTimes/), an adversary needs to make sure that: (1) the expressed Interests are routed as close to the data producer as possible, and (2) the corresponding PIT entries are stored at intermediate CCN routers for as long as possible. To avoid an Interest being served from caches of intermediate routers, every single malicious Interest has to request an unpopular or non-existing content, e.g., content with a unique name (unique junk Interests). In this disclosure, we focus on this particular attack strategy because it maximizes the damage from each malicious Interest in the CCN network. However, other less-effective strains of Interest flooding attacks can also be mitigated by applying the same or similar countermeasures used by embodiments of the present invention.

Systems for Mitigating Interests Flooding

A fundamental principle of CCN architecture, the flow balance between Interest and Data packets, can be exploited in mitigating Interests flooding. More specifically, in CCNs the Interest packet (the only communication initiator) can be satisfied with at most one Data packet, with intermediate routers to control the inbound data traffic by controlling the number of outstanding Interests in the network. Hence, one naive approach to mitigating Interests flooding is to set uniform Interest limits (called "physical limits" everywhere else) on every physical interface or CCN face. However, such an approach does not differentiate malicious interest requests from legitimate ones.

In order to distinguish between legitimate and malicious Interests, in some embodiments, the system leverages another unique feature of CCN architecture, the guaranteed symmetric flow of Interest and Data packets. Since a Data packet takes the reverse path of the corresponding Interest packet, a CCN router is able to see whether an Interest it forwarded results in a matching Data packet or the Interest results in a timeout. In addition, because malicious Interests are not likely to bring data back, this information can be utilized by CCN routers in differentiating between attacks and legitimate traffic.

Note that this timeout-based differentiation method is reactive in nature: one cannot determine in advance whether an Interest will result in a timeout or Data being retrieved. However, intermediate routers can proactively maintain up-to-date Interest satisfaction statistics, such as Interest satisfaction ratios (ISRs), which are the number of satisfied Interests versus the number of forwarded Interests, and use these statistics to determine whether an incoming Interest should be forwarded or dropped. For example, maintaining independent Interest satisfaction ratio (ISR) for each incoming interface can be sufficient to reasonably predict whether an Interest received from a neighbor coupled to this interface will result in a Data packet or a timeout if forwarded. Statistics can also be kept at finer granularities, such as per outgoing interface, per name prefix per face, etc., that can further improve this estimate. In one embodiment, the system computes ISR on a per name prefix basis. In CCN, a physical interface or face can forward different Interest packets with different name prefixes. For example, a physical interface or a face can forward Interests with name prefixes such as /parc/, /xerox/, /parc/csl, /foo/bar/, etc. The system can maintain ISR for each name prefix at each physical interface or face. For example, the system can accumulate statistics for name prefix /foo/bar/ at a particular interface by counting how many Interest packets forwarded at this particular interface with the name prefix /foo/bar/ have resulted in a timeout. In addition to name-prefix based statistics, a router may divide a physical interface into a set of virtual interfaces, and associate these statistics at each virtual interface or for each name prefix at each virtual interface. Note that, if an attacker tries to launch a DoS attack by requesting non-existing content with a fake name prefix, negative statistics for that name prefix can build up rapidly as all requests for that name prefix result in a timeout.

A router's goal should be to prioritize Interests that bring Data back while quickly penalizing those that occupy resources without generating a Data stream in return. In order to allow negative statistics to build up fast and positive statistics to deteriorate quickly, in one embodiment, the system calculates the ISR using the standard exponentially weighted moving average. In a further embodiment, the moving average is performed once a second with a coefficient $e^{-1/30}$, which approximately corresponds to a 30-second averaging window. Note that the duration of the time window for performing the moving average can be dynamically adjusted. For example, depending on traffic pattern, the moving average may be calculated every half a second or every 10 seconds. Note that, in addition to the exponentially weighted moving average, other methods can also be used to calculate ISR.

FIG. 2 presents a diagram illustrating a set of pseudocode that can be used to calculate Interest satisfaction statistics, in accordance with an embodiment of the present invention. In the example shown in FIG. 2, the statistics are evaluated for each physical interface. Other Interest satisfaction statistics, such as the Interest satisfaction statistics for each name prefix, can also be evaluated using a slightly modified version of the pseudocode shown in FIG. 2. Note that, in order to ensure decaying of relative statistics (e.g., the ratio between the number of unsatisfied and forwarded Interests), only unsatisfied statistics need to be exponentially smoothed, as shown by lines 23-26 in the pseudocode. The Interest satisfaction statistics can include both the ISR (the ratio of satisfied Interests) and the ratio of unsatisfied Interests. In the pseudocode shown in FIG. 2 the system keeps track of unsatisfied Interests at an interface ($U_{if}$).

Figure 3:
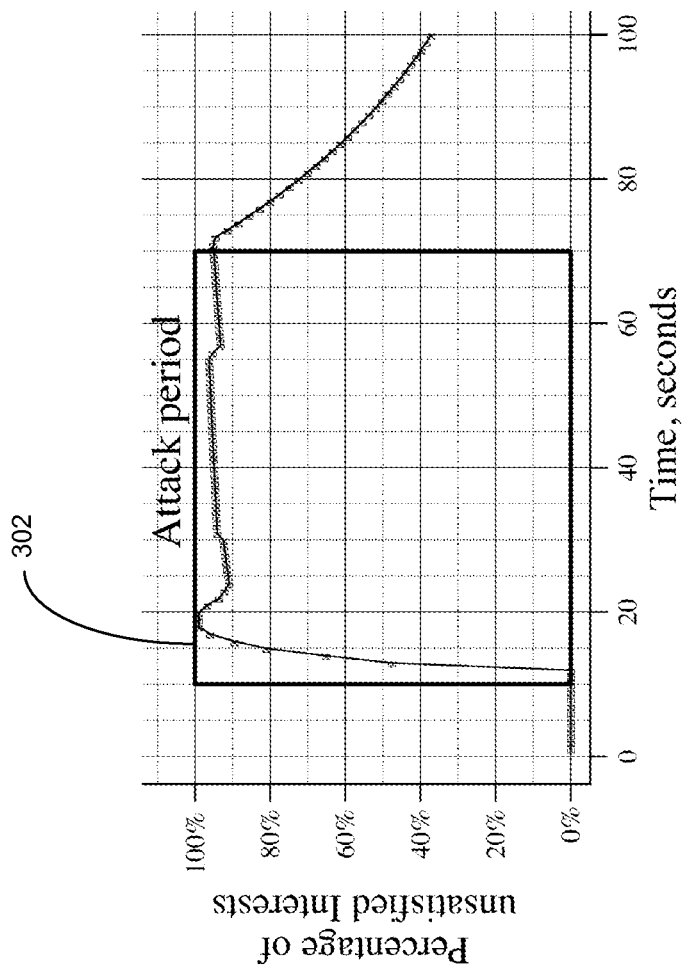
FIG. 3 presents a diagram illustrating exemplary dynamics of the Interest flooding attack.

FIG. 3 presents a diagram illustrating exemplary dynamics of the Interest flooding attack. In the example shown in FIG. 3, the attack duration is from 10 to 70 seconds, as indicated by a box 302. From FIG. 3, one can see that prior to the start of the attack the percentage of unsatisfied Interests is zero. The statistics build up rapidly as soon as Interests start to time out, which happens approximately one second after the start of the attack. For most of the attack (10-70 seconds), the percentage of unsatisfied Interests is close to 100%. When the ratio is close to 100%, routers drop all incoming Interests, resulting in decaying of the statistics (as shown by the dips in the curve) until a new Interest is admitted, which eventually brings statistics back near 100%. Finally, the ratio exponentially decays after the attack ceases.

Figure 4:
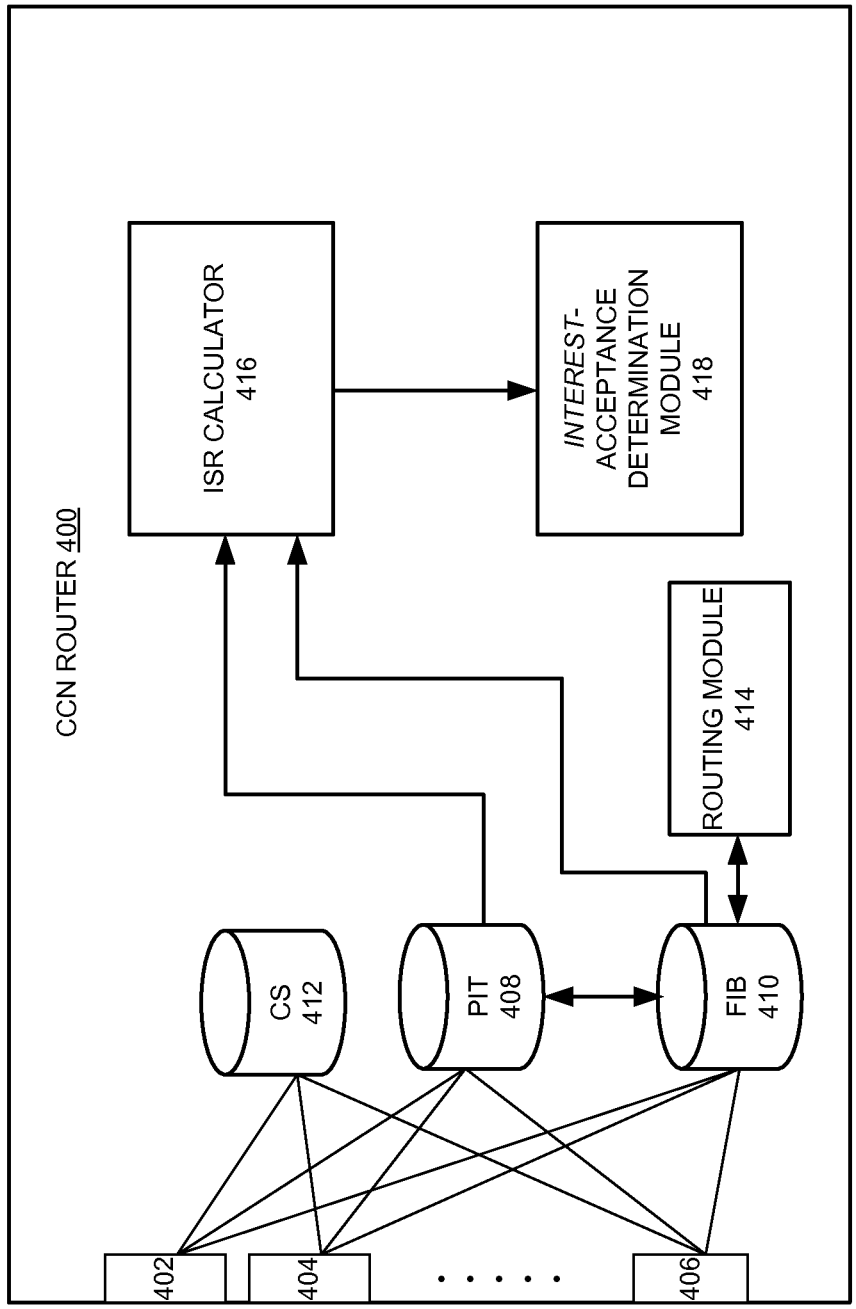
FIG. 4 presents a diagram illustrating an exemplary CCN router capable of mitigating Interest flooding attacks, in accordance with one embodiment of the present invention.

FIG. 4 presents a diagram illustrating an exemplary CCN router capable of mitigating Interest flooding attacks, in accordance with one embodiment of the present invention. In FIG. 4, CCN router 400 includes a number of physical interfaces (such as physical interfaces 402, 404, and 406), a Pending Interest Table (PIT) 408, a Forwarding Interest Base (FIB) 410, a Content Store (CS) 412, a routing module 414, an ISR calculator 416, and an Interest-acceptance determination module 418.

During operation, CCN router 400 receives Interest packets via physical interfaces 402, 404, and 406. The received Interest packets are compared with data in CS 412 to see whether matching data can be found. If no match is found, the names of the Interest packets are checked against entries in PIT 408. If the names do not exist in PIT 408, corresponding entries in PIT 408 are generated and the Interests are forwarded based on interfaces specified in FIB 410, which uses decisions made by routing module 414 as input. Entries in PIT 408 are deleted under two circumstances: the Interest is satisfied, or a timeout has occurred. Based on this per-packet state information, ISR calculator 416 can calculate ISRs for each physical interface (or face), or for each name prefix at each physical interface (or face). In one embodiment, ISR calculator 416 evaluates the number of unsatisfied Interests within a small time window by calculating an exponentially weighted moving average over a larger time window. The Interest satisfaction statistics (which may include ISR and a ratio of the unsatisfied Interests) outputted by ISR calculator 416 can be used to penalize malicious Interests. In one embodiment, the output of ISR calculator 416 is sent to Interest-acceptance determination module 418, which uses such information to determine whether to accept (forward) or reject an incoming Interest.

FIG. 5 presents a diagram illustrating a set of pseudocode that can be used for satisfaction-based Interest acceptance, in accordance with an embodiment of the present invention. Note that, in the example shown in FIG. 5, the CCN router sets an Interest limit for each physical interface (if), the limit being proportional to the bandwidth-delay product (BDP) of the interface (see line 2 of the pseudocode). More specifically, the Interest limit can be formulized as:

$$\text{Interest Limit} = \text{Delay[s]} \cdot \frac{\text{Bandwidth[Bytes/second]}}{\text{Data packet size[Bytes]}},$$

where Delay is the expected time of Interest being satisfied and Data packet size is the size of the returned Data packet. Although both these values are not known a priori, it is not necessary to use their exact values. In one embodiment, the pending Interest limit is set based on the average values of the round trip time and observed Data packet size, as the network buffers can smooth out most of the network fluctuations. Note that it is also possible to set this limit using other criteria.

In the pseudocode shown in FIG. 5, one can see that the probability of an Interest from a particular interface being dropped is proportional to the ratio of the unsatisfied Interest packets to the incoming packets, as indicated by lines 6-7) of the interface. In other words, the probability of an Interest from a particular interface being forwarded is proportional to the ISR of that interface. Note that, if the system maintains ISR on a per name prefix basis for each physical interface, then probability of an Interest being forwarded is proportional to the ISR of the name prefix of the Interest at that interface. As one can see from FIG. 3, during an Interest flooding attack, the percentage of unsatisfied Interest can be very close to 100%, meaning that the likelihood of an Interest being dropped can be close to 100%. Also, note that parameter θ (line 5) ensures that this probabilistic model is not enforced when the volume of Interests arriving at a particular interface is small. This step is critical to provide an opportunity for legitimate users to regain their share of resources after temporary Data delivery failures.

Figure 6:
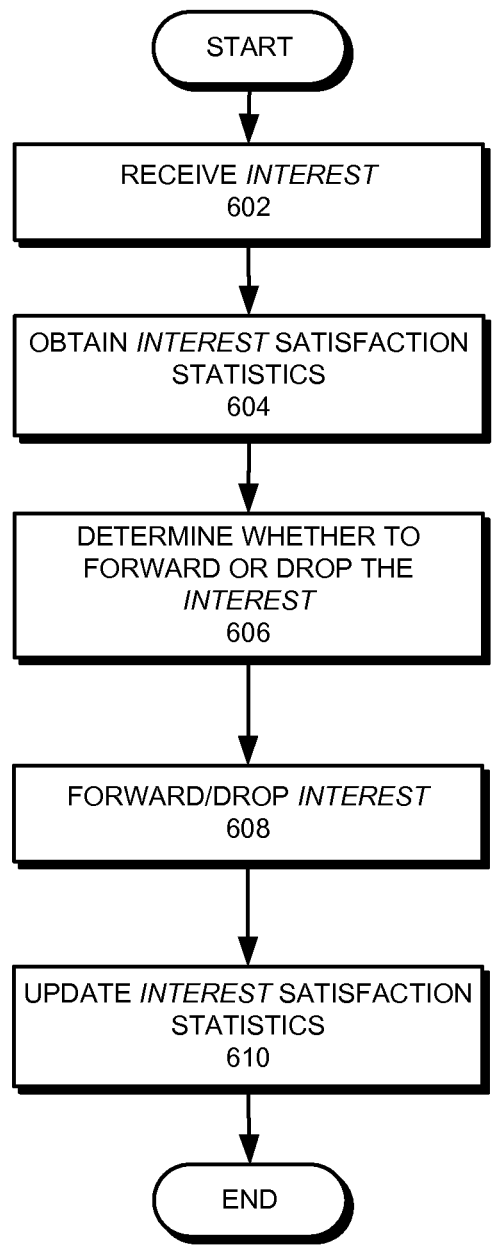
FIG. 6 presents a flowchart illustrating an exemplary Interest routing process, in accordance with an embodiment of the present invention.

FIG. 6 presents a flowchart illustrating an exemplary Interest routing process, in accordance with an embodiment of the present invention. During operation, the CCN router receives an Interest packet from one of its physical interfaces (operation 602). The router obtains current Interest satisfaction statistics for that particular interface (operation 604). In one embodiment, the router maintains Interest satisfaction statistics, including ISR and the ratio of unsatisfied Interests, for each individual incoming physical interface. In a further embodiment, the router also maintains Interest satisfaction statistics for each name prefix at each interface. Subsequently, the router determines whether to forward or drop the Interest packet based on the Interest satisfaction statistics associated with that particular interface (operation 606). In one embodiment, the probability of an Interest packet being forwarded is proportional to the ISR associated with the physical interface from which the Interest was forwarded. In one embodiment, an Interest packet is dropped if the ISR associated with the physical interface from which the Interest was forwarded (or the ISR associated with a particular name prefix at that physical interface) is less than a predetermined threshold. In a further embodiment, the threshold is dynamically configurable. Subsequently, the router forwards or drops the Interest (operation 608), and updates the Interest satisfaction statistics (operation 610).

A drawback of this satisfaction-based Interest acceptance method is that each router on the path makes an independent decision whether to forward or drop an Interest. Because of these independent decisions, the probability of legitimate Interests being forwarded decreases rapidly as the number of hops between the content requester and the content producer grows. For example, in FIG. 1, CCN router 102 may observe a 50% satisfaction rate for interface 112 (which is coupled to legitimate-user end node 106) and a 0% satisfaction rate for interface 114 (which is coupled to adversary end node 108). In the meantime, CCN router 104 may observe a 30% satisfaction rate for interface 118 (which is coupled to CCN router 102). As a result, when a legitimate Interest arrives at CCN router 102 via interface 112, it has a 50% chance of being forwarded further; if forwarded, it has only a 50%×30%=15% probability of being forwarded further toward data-producer end node 110. With each increasing hop in the network, the probability of being forwarded to the next hop decreases significantly. The increased Interest dropping probability at upstream nodes worsens the Interest satisfaction statistics at those nodes and may result in further drops.

In some embodiments, to prevent this overreaction and unfair penalization, the system ensures that the decision taken at each router on whether to forward or drop an Interest is not independent of the decision made by preceding routers. In a further embodiment, the system may implement an explicit notification, such as a gossip protocol, between neighboring CCN routers to ensure that each router makes its Interest forwarding decision based on decisions made by previous routers.

The satisfaction-based Interest acceptance method effectively divides the available forwarding tokens (a concept that is similar to the tokens in the well-known token bucket algorithm currently widely used in the packet-switched network) among all interfaces proportional to their ISRs. In some embodiments, instead of proportional token distribution, the system enforces explicit Interest limits for each incoming interface or for each name prefix at each face, where the value of the limit depends directly on the interface's ISR. This technique is also called the satisfaction-based pushback. In a further embodiment, CCN routers announce these limits to their downstream neighbors, which in turn adjust Interest limits for their incoming physical interfaces accordingly. Various messaging mechanisms can be used by the CCN routers for announcing their Interest limits to downstream routers. For example, a gossip protocol can be used by CCN routers to periodically send control messages to their neighbors to indicate the Interest limits, either on a per interface basis or on a per name prefix-per interface basis. Moreover, such control messages can also be part of heartbeat messages that a router sends to its neighboring routers. In addition, any other communication techniques between two routers either currently in use or invented in the future may be used to communicate the Interest limits between routers. Upon receiving the Interest limit of its upstream router, the downstream router adjusts the Interest limits for its own incoming interfaces based on the upstream Interest limits. In one embodiment, the downstream router adjusts the Interest limits for its incoming interfaces in proportion to the Interest limits of its upstream router. This ensures that any Interest forwarded from the downstream router is allowed to get through, thus resulting in genuine Interest satisfaction statistics.

Figure 8:
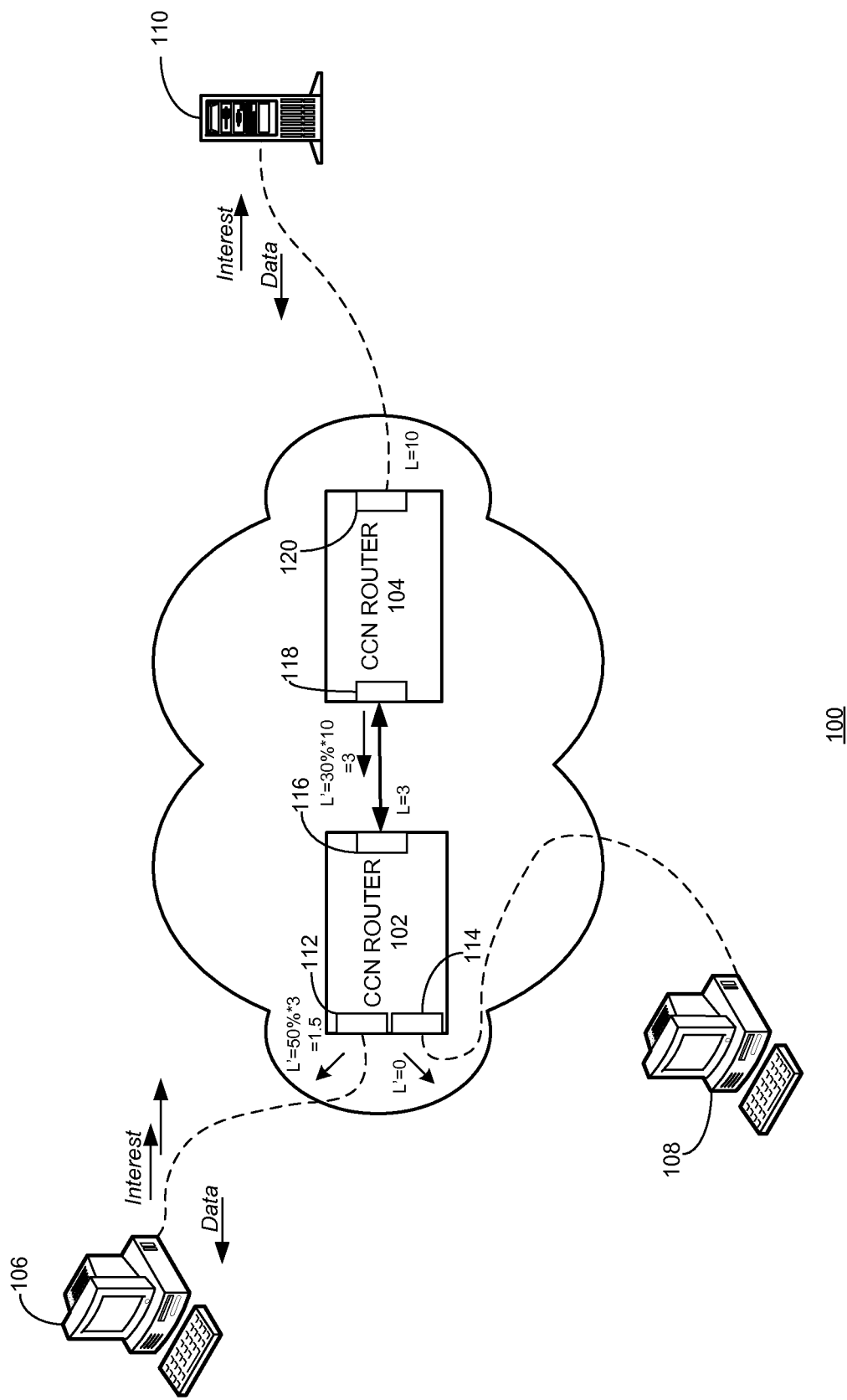
FIG. 8 presents a diagram illustrating an exemplary scenario where satisfaction-based pushback is implemented, in accordance with an embodiment of the present invention.

FIG. 7 presents a diagram illustrating a set of pseudocode that can be used for satisfaction-based pushback, in accordance with an embodiment of the present invention. FIG. 8 presents a diagram illustrating an exemplary scenario where satisfaction-based pushback is implemented, in accordance with an embodiment of the present invention.

In the example shown in FIG. 8, the initial Interest limit is set as L=10. CCN router 102 observes a 50% satisfaction rate for interface 112 (which is coupled to legitimate-user end node 106) and a 0% satisfaction rate for interface 114 (which is coupled to adversary end node 108). In the meantime, CCN router 104 observes a 30% satisfaction rate for interface 118 (which is coupled to CCN router 102). Based on the corresponding ISR, CCN router 104 sets the Interest limit for its incoming interface 118 as L'=30%×10=3, and announces this Interest limit to CCN router 102. After receiving the announcement from CCN router 104, CCN router 102 readjusts its incoming interface Interest limit to L'=50%×3=1.5 for interface 112 and L'=0%×3=0 for interface 114. Note that these limits are then announced to both legitimate-user end node 106 and adversary end node 108. Both the legitimate users and adversaries may either obey or ignore the announced Interest limit, which will be in any case enforced by CCN router 102.

The zero limit for the adversary's link in FIG. 8 implies that CCN router 102 is temporarily not willing to accept any Interests from interface 114 until the statistics decay to the appropriate level, as shown in FIG. 3 where the percentage of unsatisfied Interest drops gradually after the attack period.

At the next iteration of this satisfaction-based pushback algorithm, legitimate-user end node 106 will be able to gradually improve the statistics on both routers 102 and 104 because all Interests from the user will get through and return Data, eventually resulting in a full allowance (L'=L=10) in the links between CCN routers 102 and 104, and legitimate-user end node 106 and CCN router 102.

Figure 9:
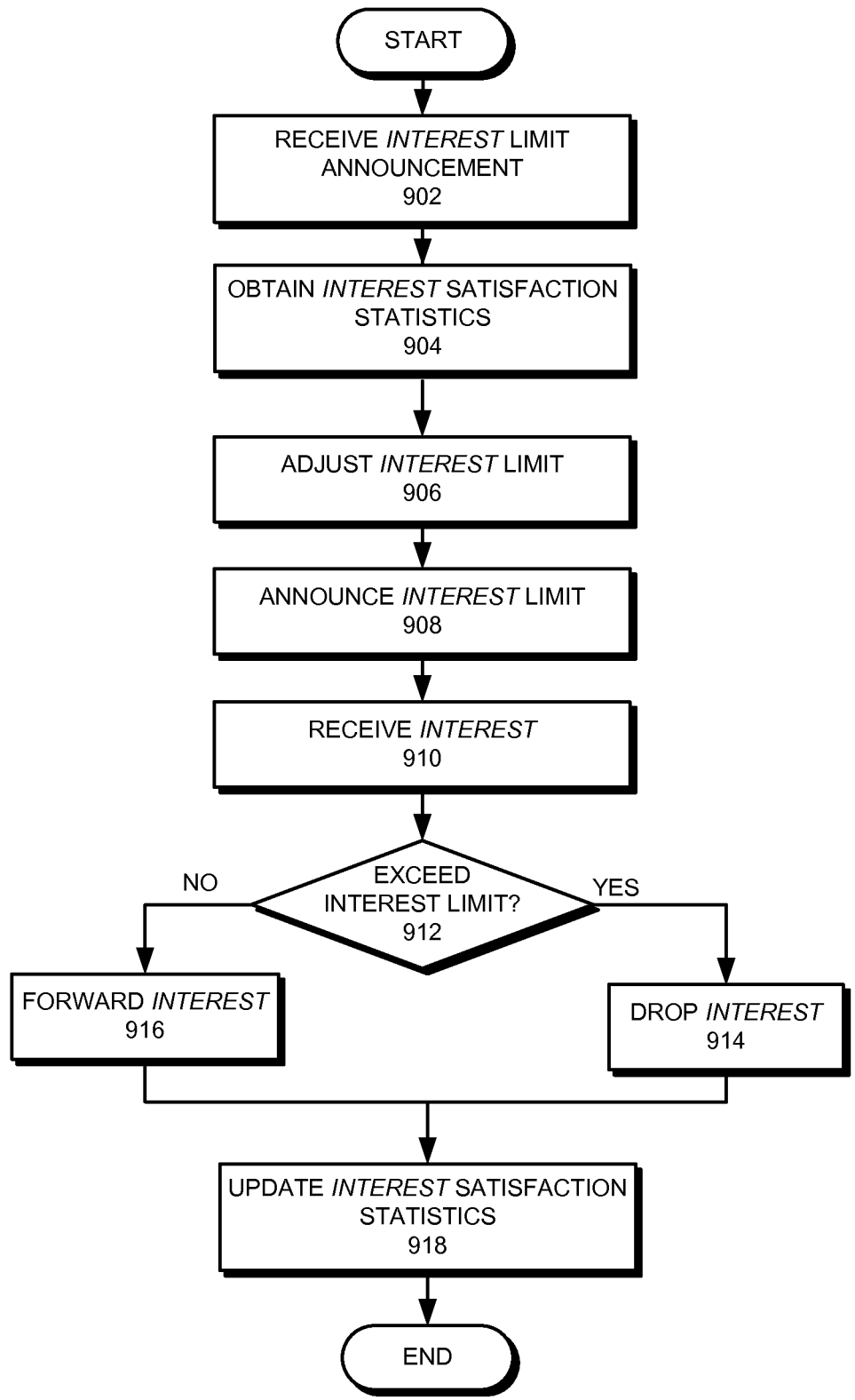
FIG. 9 presents a flowchart illustrating an exemplary Interest routing process, in accordance with an embodiment of the present invention.

FIG. 9 presents a flowchart illustrating an exemplary Interest routing process, in accordance with an embodiment of the present invention. During operation, an intermediate CCN router receives an announced Interest limit from an upstream router (operation 902). Note that if the router is an edge router, such a limit may be a system default or manually set by an administrator. The CCN router obtains current Interest satisfaction statistics for its incoming interfaces (operation 904), and adjusts the Interest limit for those incoming interfaces based on the Interest satisfaction statistics and the received Interest limit announcement (operation 906). In one embodiment, the Interest limit for a particular incoming interface is proportional to its ISR and the Interest limit of the upstream router. Note that in the pseudocode shown in FIG. 7, we explicitly use "outgoing" and "incoming" interfaces. However, all interfaces can be both incoming and outgoing. Thus, it may not be entirely clear which outgoing limit ($L_{out}$) should be used to calculate the incoming limit ($L_{in}$). To overcome this problem, in some embodiments, the system enforces separate incoming/outgoing interface limits for each individual FIB entry. That is, for each FIB entry, the system sets a separate Interest limit for each incoming interface ($L'^{fib}_{in}$) based on a sum of FIB entry limits for each outgoing interface $L=\Sigma L^{fib}_{out}$.

Subsequently, the intermediate router announces the readjusted Interest limits to its downstream routers (operation 908). The router receives an Interest from a physical interface (operation 910), and determines whether the Interest exceeds the Interest limit set for that particular interface (operation 912). If so, the router drops the Interest (operation 914); otherwise, the router forwards the Interest (operation 916). Subsequent to the forwarding or dropping of the Interest, the router updates its Interest satisfaction statistics (operation 918).

Note that compared with other well-known pushback mechanisms, embodiments of the present invention suppress (or push back) unwanted requests for data, not actual data itself. In addition, differentiating between good and bad Interests is based on the traffic symmetry principle of CCN.

Computer System

Figure 10:
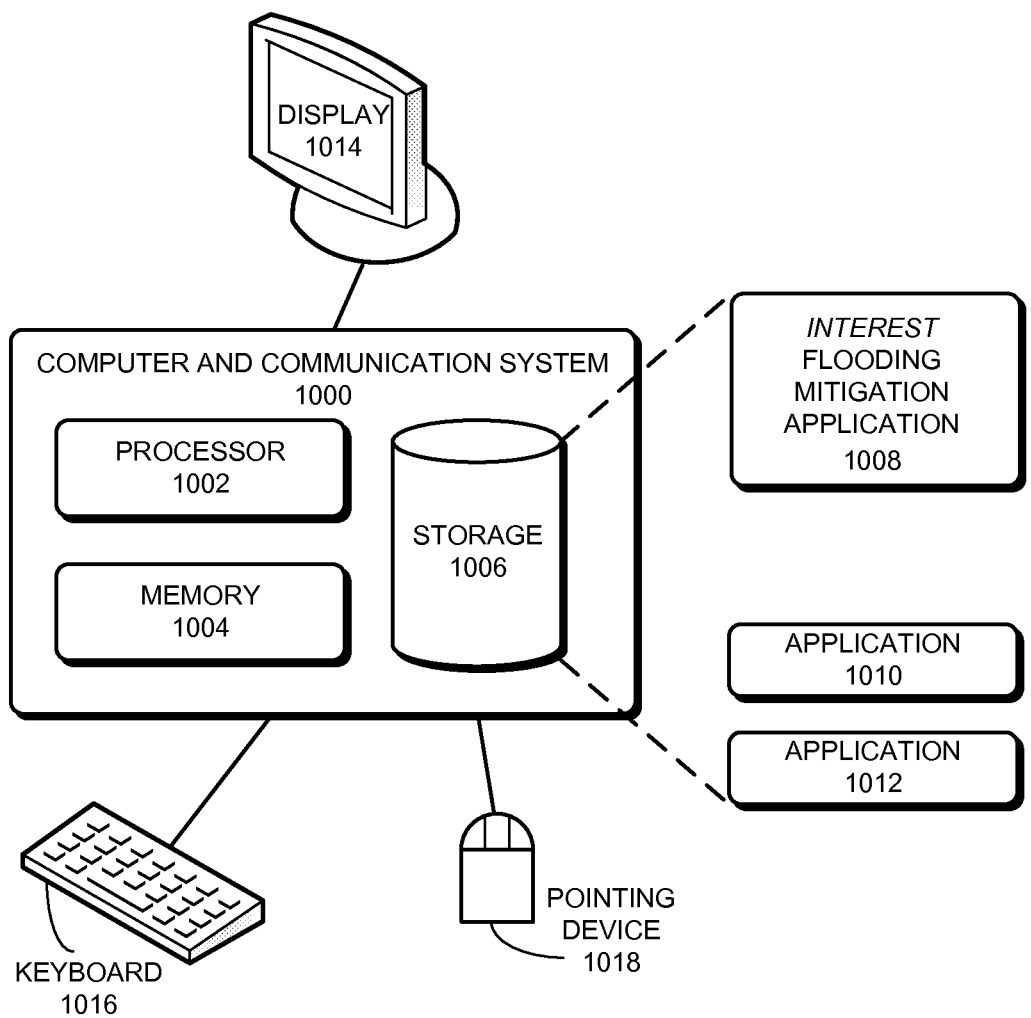
FIG. 10 illustrates an exemplary computer system for mitigating Interest flooding attacks, in accordance with one embodiment of the present invention.

FIG. 10 illustrates an exemplary computer system for mitigating Interest flooding attacks, in accordance with one embodiment of the present invention. In one embodiment, a computer and communication system 1000 includes a processor 1002, a memory 1004, and a storage device 1006. Storage device 1006 stores an Interest flooding mitigation application 1008, as well as other applications, such as applications 1010 and 1012. During operation, Interest flooding mitigation application 1008 is loaded from storage device 1006 into memory 1004 and then executed by processor 1002. While executing the program, processor 1002 performs the aforementioned functions. Computer and communication system 1000 is coupled to an optional display 1014, keyboard 1016, and pointing device 1018.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for mitigating Interest flooding attacks in content-centric networks (CCNs), comprising:
   receiving, by a network device via a physical interface of the network device, Interest packets for one or more name prefixes;
   counting a number of Interests received via the physical interface and deleted from a pending Interest table due to a timeout;
   computing Interest satisfaction statistics for the physical interface based on the counted Interests; and
   in response to receiving an Interest packet for a target name prefix, determining whether to forward or drop the Interest packet based on the Interest satisfaction statistics for the target name prefix.

2. The method of claim 1, wherein the Interest satisfaction statistics associated with the physical interface further comprise at least one of:
   per-interface based Interest satisfaction statistics;
   per-name-prefix-per-interface based Interest satisfaction statistics;
   per-face based Interest satisfaction statistics;
   per-name-prefix-per-face based Interest satisfaction statistics;
   per-virtual-interface based Interest satisfaction statistics; and
   per-name-prefix-per-virtual-interface based Interest satisfaction statistics.

3. The method of claim 1, wherein the interest satisfaction statistics further comprises a ratio between satisfied Interest packets and received Interest packets.

4. The method of claim 3, wherein determining whether to forward or drop the Interest packet is further based on the ratio between the satisfied Interest packets and the received Interest packets.

5. The method of claim 3, wherein determining whether to forward or drop the Interest packet involves:
   receiving, from a neighboring router, an outstanding Interest limit announcement indicating a maximum number of Interest packets acceptable by the neighboring router; and
   assigning an outstanding Interest limit for the physical interface based on the Interest satisfaction statistics and the maximum number of the outstanding Interest packets acceptable by the neighboring router, wherein an outstanding Interest is an Interest that is not satisfied an not yet and not yet expired.

6. The method of claim 1, wherein computing Interest satisfaction statistics further comprises:
    determining whether an Interest packet has been satisfied by a corresponding data packet.

7. The method of claim 1, further comprising updating the Interest satisfaction statistics subsequent to the Interest packet being satisfied or expired.

8. A non-transitory computer-readable storage medium storing instructions that when executed by a computer cause the computer to perform a method for mitigating Interest flooding attacks in content-centric networks (CCNs), the method comprising:
    receiving, by a network device via a physical interface of the network device, Interest packets for one or more name prefixes;
    counting a number of Interests received via the physical interface and deleted from a pending Interest table due to a timeout;
    computing Interest satisfaction statistics for the physical interface based on the counted Interests; and
    in response to receiving an Interest packet for a target name prefix, determining whether to forward or drop the Interest packet based on the Interest satisfaction statistics for the target name prefix.

9. The computer-readable storage medium of claim 8, wherein the Interest satisfaction statistics associated with the physical interface further comprise at least one of:
    per-interface based Interest satisfaction statistics;
    per-name-prefix-per-interface based Interest satisfaction statistics;
    per-face based Interest satisfaction statistics;
    per-name-prefix-per-face based Interest satisfaction statistics;
    per-virtual-interface based Interest satisfaction statistics; and
    per-name-prefix-per-virtual-interface based Interest satisfaction statistics.

10. The computer-readable storage medium of claim 8, wherein the Interest satisfaction statistics further comprises a ratio between satisfied Interest packets and received Interest packets.

11. The computer-readable storage medium of claim 10, wherein determining whether to forward or drop the Interest packet is further based on the ratio between the satisfied Interest packets and the received Interest packet.

12. The computer-readable storage medium of claim 10, wherein determining whether to forward or drop the Interest packet involves:
    receiving, from a neighboring router, an outstanding Interest limit announcement indicating a maximum number of Interest packets acceptable by the neighboring router; and
    assigning an outstanding Interest limit for the physical interface based on the Interest satisfaction statistics and the maximum number of the outstanding Interest packets acceptable by the neighboring router, wherein an outstanding Interest is an Interest that is not satisfied and not yet expired.

13. The computer-readable storage medium of claim 8, wherein computing Interest satisfaction statistics further comprises:
    determining whether an Interest packet has been satisfied by a corresponding data packet.

14. The computer-readable storage medium of claim 8, wherein the method further comprises updating the Interest satisfaction statistics subsequent to the Interest packet being satisfied or expired.

15. A router in a content-centric network (CCN) for mitigating Interest flooding attacks, comprising:
    a physical interface for receiving Interest packets for one or more name prefixes;
    an Interest counter configured to count a number of Interests received via the physical interface and deleted from a pending Interest table due to a timeout;
    an Interest satisfaction statistics calculator configured to compute Interest satisfaction statistics for the physical interface based on the counted Interests; and
    a determination mechanism configured to determine whether to forward or drop an Interest packet based on the Interest satisfaction statistics for a target name prefix, in response to receiving the Interest packet for the target name prefix.

16. The router of claim 15, wherein the Interest satisfaction statistics associated with the physical interface further comprise at least one of:
    per-interface based Interest satisfaction statistics;
    per-name-prefix-per-interface based Interest satisfaction statistics;
    per-face based Interest satisfaction statistics;
    per-name-prefix-per-face based Interest satisfaction statistics;
    per-virtual-interface based Interest satisfaction statistics; and
    per-name-prefix-per-virtual-interface based Interest satisfaction statistics.

17. The router of claim 15, wherein the Interest satisfaction statistics further comprises a ratio between satisfied Interest packets and received Interest packets.

18. The router of claim 17, wherein the determination mechanism is configured to determine whether to forward or drop the Interest packet further based on the ratio between the satisfied Interest packets and the received Interest packets.

19. The router of claim 17, wherein while determining whether to forward or drop the Interest packet, the determination mechanism is further configured to:
    receive, from a neighboring router, an outstanding Interest limit announcement indicating a maximum number of Interest packets acceptable by the neighboring router; and
    assign an outstanding Interest limit for the physical interface based on the Interest satisfaction statistics and the maximum number of the outstanding Interest packets acceptable by the neighboring router, wherein an outstanding Interest is an Interest that is not satisfied and not yet expired.

20. The router of claim 19, wherein the Interest limit announcement is included in one of:
    a gossip protocol message;
    a router control message; and
    a router heartbeat message.

21. The router of claim 15, wherein the Interest satisfaction statistics calculator is further configured to:
    determine whether an Interest packet has been satisfied by a corresponding data packet.

22. The router of claim 15, wherein the Interest satisfaction statistics calculator is further configured to update the Interest satisfaction statistics subsequent to the Interest packet being satisfied or expired.

* * * * *